Jan. 27, 1959 A. J. RADCLIFFE, JR 2,871,293

MULTICHANNEL TELEPHONE CARRIER SYSTEM

Filed Sept. 17, 1954 4 Sheets-Sheet 2

Jan. 27, 1959 A. J. RADCLIFFE, JR 2,871,293

MULTICHANNEL TELEPHONE CARRIER SYSTEM

Filed Sept. 17, 1954 4 Sheets-Sheet 3

MULTICHANNEL TELEPHONE CARRIER SYSTEM

Filed Sept. 17, 1954 4 Sheets-Sheet 4

United States Patent Office 2,871,293

Patented Jan. 27, 1959

2,871,293

MULTICHANNEL TELEPHONE CARRIER SYSTEM

Arthur J. Radcliffe, Jr., La Grange, Ill., assignor to International Telephone and Telegraph Corporation, a corporation of Maryland Application September 17, 1954, Serial No. 456,730

7 Claims. (Cl. 179—15)

This invention relates to a multichannel telephone carrier system. Its main object is to provide an improved multichannel telephone carrier system of increased dependability and decreased cost of production.

GENERAL DESCRIPTION

It has been chosen to disclose the invention as applied to a frequency-separation system and to one wherein dual modulation is employed at the transmitting end and the receiving end of each channel, whereby the several channels may employ similar transmitting equipments and similar receiving equipments.

It is common in such a system to use the same modulation frequency for the first modulator at the transmitting end, and for the second modulator at the receiving end, of all channels. A separate band-allocating modulation frequency is used at the second transmitting modulator and at the first receiving modulator of each channel. It is also common to use a balanced modulator, which balances out one of the input frequencies, whereby only the other input frequency and the two side bands are passed. A succeeding filter eliminates the unwanted side band and escaped input frequency.

It is desirable to use a high ratio of carrier signal to input signal at the first transmitting modulator to minimize certain undesired modulation products which arise thereat when the two signals are of similar value. An important related feature of the invention is that the carrier input is supplied to the first modulator in square-wave form to minimize the short intervals between half cycles of a sine wave of similar amplitude when the carrier strength does not exceed the input signal strength.

A feature of the transmitting section of any channel is that the second transmitting modulator is arranged to balance out the modulated intelligence input, while passing the local frequency, to some extent, along with the two side bands, in contrast to the usual arrangement for balancing out the local frequency while passing the intelligence input, to some extent, along with the two side bands. The resulting utility is that a simpler filter arrangement suffices to eliminate the passed component of the local frequency than is required to separate the intelligence input frequency from the desired side band.

It has been further chosen to illustrate the invention as applied to a system wherein a two-wire balanced-to-ground telephone line, such as an open-wire or a loaded-cable pair, is the transmission medium. Heretofore, transformers, or repeating coils, have been required to couple the two-wire balanced-to-ground transmission line with the triode amplifiers usually used in the transmitting section and in the receiving section of each channel, since any such usual amplifier is an unbalanced-to-ground device at its input and at its output. Most transformers with magnetic cores are undesirable for the stated coupling function because they tend to act as modulators and to thus cross-modulate the carrier channels to provide mutual interference, and air-core transformers are bulky and expensive when designed for the usual telephone carrier range.

It is accordingly, an object of the invention to provide suitable low-cost arrangements for coupling the transmitting and receiving channel sections to the two-wire balanced-to-ground transmission line without cross-modulation.

In carrying out this object, a transmitter-output amplifier is provided which takes advantage of the feature that the cathode and anode output potentials of an amplifier triode are equal and opposite with respect to ground when the power-supply paths to these elements provide them with equal impedances to ground. The cathode portion of such an amplifier, however, has the usual degenerative characteristics of a cathode-follower amplifier which are not normally shared by the anode portion. Consequently, the coupled line acts unbalanced from the standpoint of externally applied signals, as from the other end, or from another transmitting channel at the same end of the line.

A special feature of the invention relates to providing a second grid control for the balanced output amplifier by causing the anode output potential to act in opposition to the signal-input grid control, whereby the anode portion of the amplifier is provided with degenerative characteristics matching those of the cathode portion, thus restoring the balance from the standpoint of externally applied signals. In the preferred disclosed embodiment, the second grid control is exercised through a separate control grid.

In the disclosed arrangement, the necessity for transformer coupling between the common transmission line and the receiving sections is avoided by carrying the two line conductors into any receiving channel through respective conventional triode amplifiers whose output conductors comprise a local balanced-to-ground pair. This local pair is carried in balanced fashion to the first receiving modulator, without using an input transformer at the modulator, whereby the undesired cross-channel transformer-originated modulation in any receiver section is avoided.

The drawings:

Referring to the drawings, Fig. 1 is a block diagram of a system embodying the invention; Figs. 2 and 3 comprise a preferred circuit diagram of transmitting and receiving channels T1 and R10 of Fig. 1; and Fig. 4 discloses a desirable modification of the circuit arrangement of Fig. 3.

DETAILED DESCRIPTION

The invention having been described generally, a detailed description will now be given.

Figure 1:
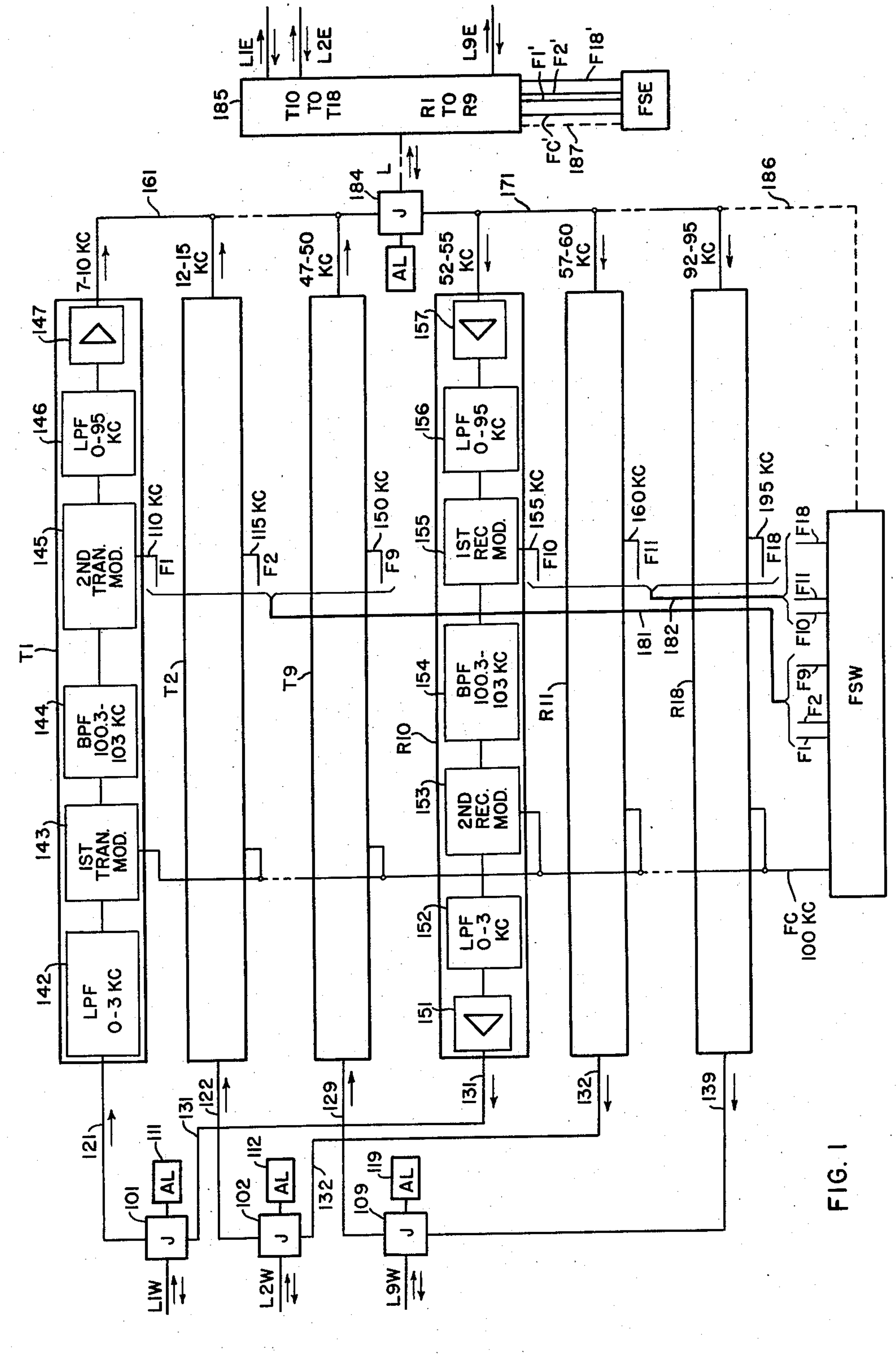

*Fig. 1.—Block diagram*

Referring to Fig. 1, a single-line block diagram, transmission line L connects West and East exchanges W and E, which contain carrier transmission apparatus to permit carrier line L to be used as the common transmission path connecting nine two-way lines L1W to L9W at exchange W respectively to lines L1E to L9E at exchange E. This requires nine West-East transmission paths over L, and nine East-West transmission paths thereover, for a total of eighteen one-way paths, or channels. These channels are frequency separated, and each employs a transmitting section in one exchange and a receiving section in the other. Channels 1 to 9 for West-East transmission use transmitting sections T1 to T9 in exchange W, and the corresponding respective receiving sections R1 to R9 (not individually shown) in exchange E. Channels 10 to 18 for East-West transmission use transmitting sections T10 to T18 in exchange E (not individually shown), and the corresponding respective receiving sections R10 to R18 in exchange W.

The nine individual lines at either exchange are each connected to its corresponding oppositely directed one-way channels through the usual balanced junctions, such as 101 to 109 for lines L1W to L9W, artificial lines 111 to 119 being associated respectively therewith in the usual manner, with respective outgoing connections from these junctions over conductor pairs 121 to 129 to transmitting sections T1 to T9, and respective incoming connections over conductor pairs 131 to 139 from receiving sections R10 to R18.

*Transmitting sections*

The transmitting sections T1 to T18 are all similar, and each has equipment as shown for section T1. They are differentiated by supplying each with a separate band-allocating frequency at its second modulator 145.

Voice frequencies incoming from line L1W pass through balanced junction 101, over conductor pair 121, and through low-pass filter 142, which limits the signal frequencies to a maximum of 3000 cycles.

A first transmitting modulator 143 combines the input voice frequency signal with the common modulation signal from conductor FC. The upper side band is selected by band-pass filter 144.

The selected side band is combined in a second transmitting modulator 145 with the band-alloacting frequency from conductor F1 to produce the transmitted frequency band for the channel. Low-pass filter 146 eliminates undesired signals and modulation products.

Output amplifier 147 couples the output from transmitting section T1 to conductor pair 161, in parallel with the output from similar amplifiers for transmitting sections T2 to T9 respectively.

Balanced junction 184 connects the output of the transmitting sections on conductor pair 161 to line L, and connects the input from line L to conductor pair 171 for the receiving sections, with artificial line 183 balancing line L, whereby pairs 161 and 171 are conjugate.

*Receiving sections*

All receiving sections have similar equipment as shown at R10.

The input from conductor pair 171 is carried through a balanced input amplifier 157, and a balanced low-pass filter 156, to the first receiving modulator 155.

The input signal is combined in the first receiving modulator 155 with the band allocating frequency from conductor F10, and the signal in the output of the modulator for the channel is selected by band-pass filter 154.

A second receiving modulator 153 combines the selected signal with the common modulation frequency from conductor FC to re-create the voice frequency signal for the channel. Low-pass filter 152 eliminates high-frequency components, and the voice signal is then passed through output amplifier 151, conductor pair 131, and balanced junction 101 to line L1W.

*Frequency sources and allocations*

For frequency separation using dual modulation, a common frequency and eighteen separate band-allocation frequencies, one per channel, are employed. These local modulation frequencies, or carriers, are supplied by frequency sources FSW and FSE in the respective exchanges, over conductors FC, F1 to F18, FC′, and F1′ to F18′.

The common frequency is used for modulation at the first modulator of all the transmitting sections, and the second modulator of all the receiving sections. It is supplied over conductor FC from frequency source FSW and over conductor FC′ from frequency source FSE, at the respective exchanges. It is desirable that this frequency be higher than the maximum frequency transmitted over the line L, to simplify filtering. A value of 100 kilocycles has been chosen.

The band-allocation local modulation frequencies, and the frequency bands transmitted over line L are given for the several channels in the accompanying tables.

The West-East channels 1 to 9 have their band-allocation frequencies supplied by frequency source FSW over respective conductors F1 to F9 in conductor-group 181 to the second modulators of their transmitting sections at exchange W, and the same frequencies are supplied by frequency source FSE over conductors F1′ to F9′ to the first modulators of the respective receiving sections R1 to R9 at exchange E. The band-allocation frequencies and the transmission band frequencies for these channels are given in Table 1.

The East-West channels 10 to 18 have their band-allocation frequencies supplied by respective conductors F10′ to F18′ to the second modulators of the respective transmitting sections at exchange E and the same frequencies are supplied by frequency source FSW over conductors F10 to F18 in conductor group 182 to the respective receiving sections at exchange W. The band-allocation frequencies and the transmission band frequencies for these channels are given in Table 2.

TABLE 1.—WEST-EAST CHANNELS

| Channel | Band-Allocation Frequency, Kilocycles | Transmission Band, Kilocycles |
|---|---|---|
| 1 | 110 | 7–9.7 |
| 2 | 115 | 12–14.7 |
| 3 | 120 | 17–19.7 |
| 4 | 125 | 22–24.7 |
| 5 | 130 | 27–29.7 |
| 6 | 135 | 32–34.7 |
| 7 | 140 | 37–39.7 |
| 8 | 145 | 42–44.7 |
| 9 | 150 | 47–49.7 |

TABLE 2.—EAST-WEST CHANNELS

| Channel | Band-Allocation Frequency, Kilocycles | Transmission Band, Kilocycles |
|---|---|---|
| 10 | 155 | 52–54.7 |
| 11 | 160 | 57–59.7 |
| 12 | 165 | 62–64.7 |
| 13 | 170 | 67–69.7 |
| 14 | 175 | 72–74.7 |
| 15 | 180 | 77–79.7 |
| 16 | 185 | 82–84.7 |
| 17 | 190 | 87–89.7 |
| 18 | 195 | 92–94.7 |

The various frequencies may be supplied by nineteen separate oscillators at each frequency source, or by one master oscillator at each frequency source, such as a 100-kilocycle oscillator for supplying the common frequency, with the other frequencies derived therefrom in the usual manner. If desired, a single 100-kilocycle master oscillator at FSE may be used, and a 100-kilocycle control signal may be transmitted therefrom, over line L, to the frequency source FSW by way of connections 187 and 186, as is known in the art. Thereby, the overall signal-frequency distortions resulting from differing frequencies at the two ends of a channel are avoided.

Figure 2:
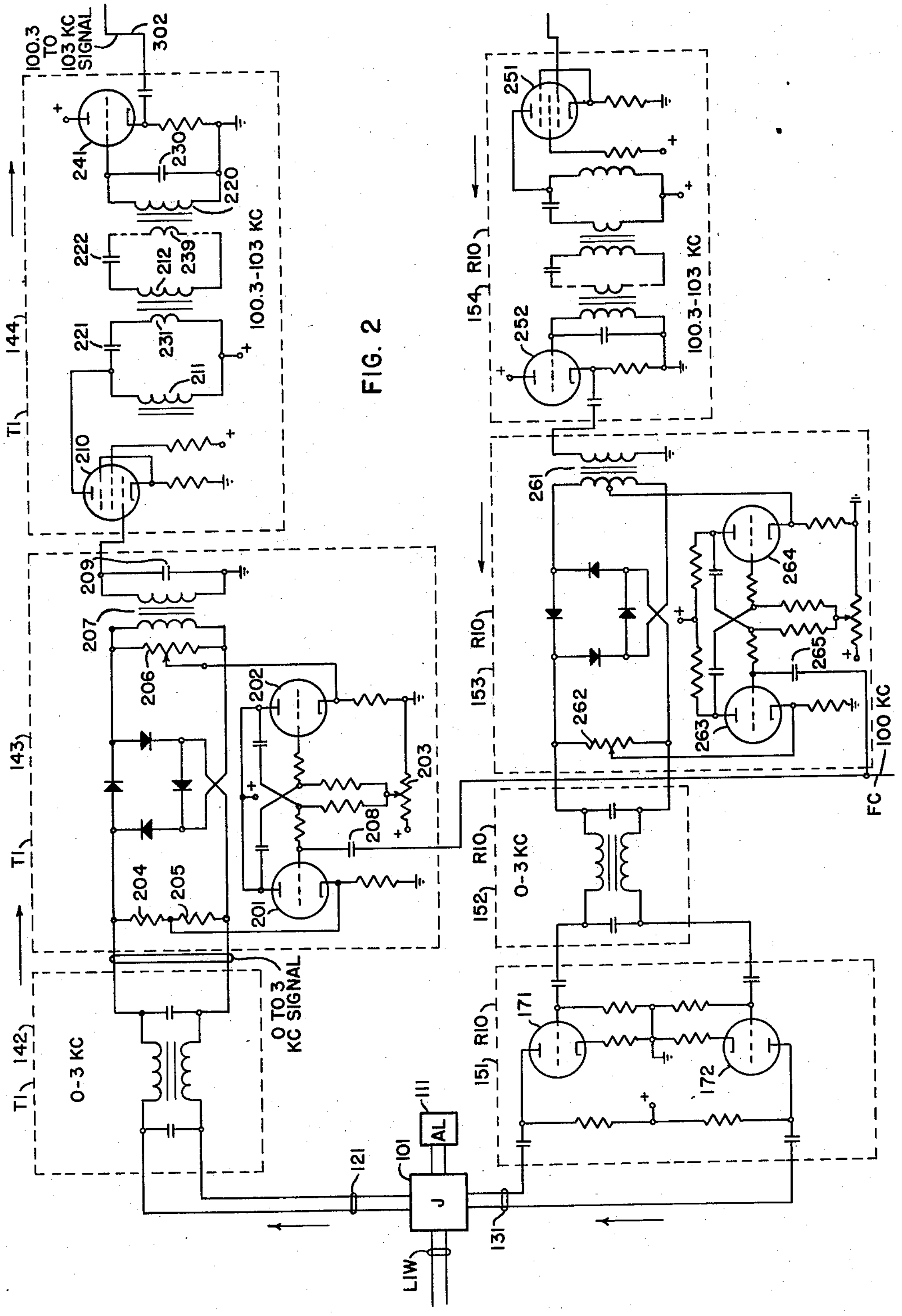
Figure 3:
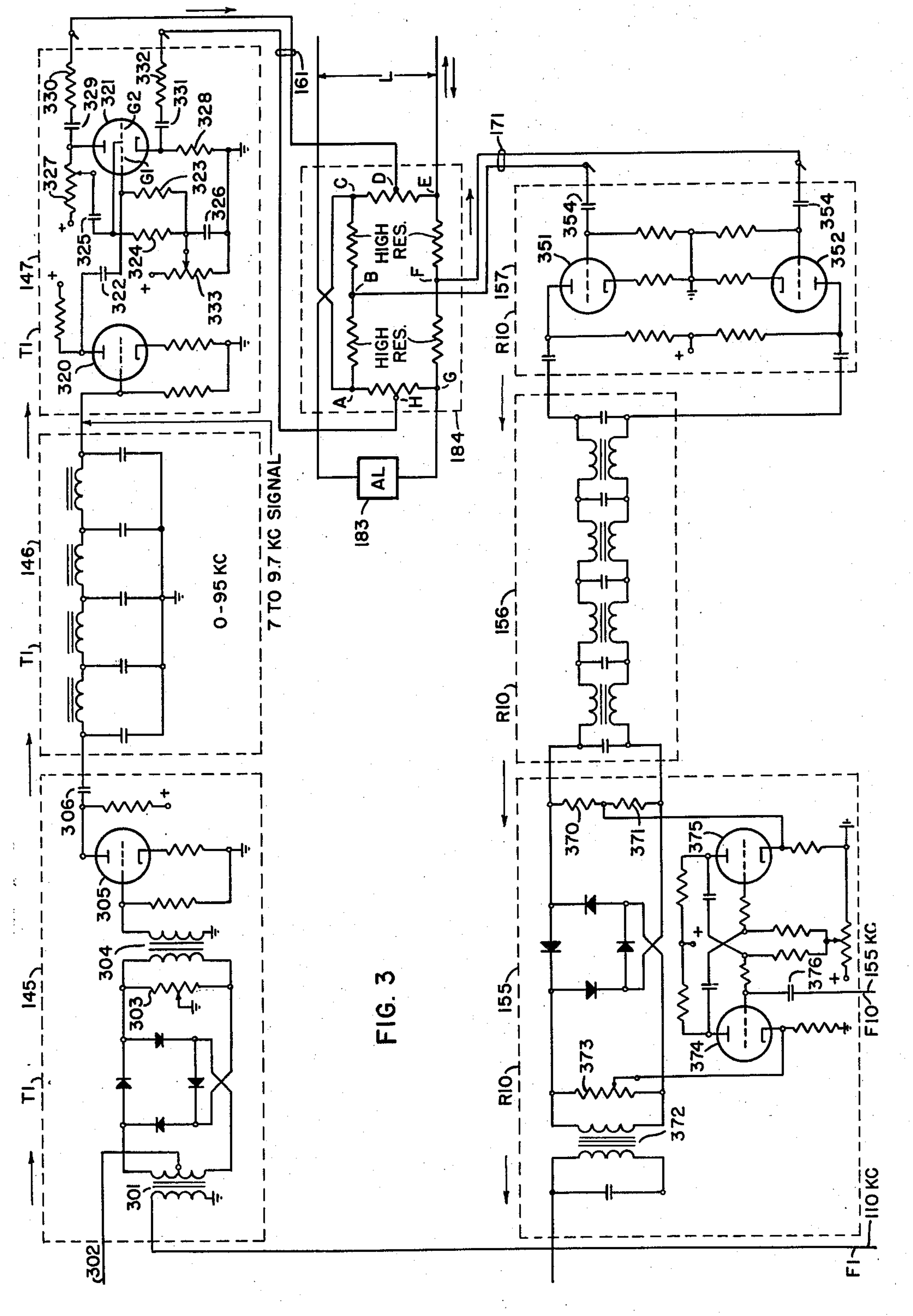

*Figs. 2 and 3.—Circuit diagram*

Referring to Figs. 2 and 3, a circuit diagram is shown of the apparatus of Fig. 1 at exchange West, associated with a two-way channel between line L1W and transmission line L, comprising transmitting section T1, and receiving section R10.

*Transmitter section T1*

Voice-frequency signals from line L1W pass through junction 101 and over path 121 to transmitting section T1. Therein, they pass through the low-pass filter 142 to reach the first transmitting modulator 143, whereat they are impressed across the input conductors and across resistors 204 and 205 in series. By the usual diode ring, comprising the illustrated four diode rectifiers of 143, the input voice signals are barred from reaching output transformer 207 except for the alternate biasing of the diode ring by the longitudinally applied carrier current, which is controlled by the 100-kilocycle current over wire FC and is applied in balanced fashion by multivibrator 201, 202, through the junction of resistors 204, 205 and through the slide arm of resistor 206.

Where, such as at 143, a modulator accepts low signal frequencies (3000 to 0 cycles) which are mutually modulated with a relatively high carrier frequency (100,000 cycles), it is important to maintain the carrier-current level higher than the signal-current level substantially throughout each cycle of carrier current in order to avoid undesired distortion-produced harmonics which, when permitted, fall to a considerable extent within the useful output signal range. Heretofore, this has been accomplished to a large extent by using a sine-wave carrier of such a high value that its percentage of dwell, in the region of its zero value, at values less than voice-signal value is very small. Such an arrangement, however, besides being wasteful of carrier energy, places a severe strain on the components of the modulator, such as on the diodes of 143. Herein, the necessity for the noted excessive value of carrier current at modulator 143 is avoided by supplying the carrier current as a square wave. Such a square wave could be supplied over the common conductor FC, but it is thought to be better to use a separate multivibrator 201, 202 at each modulator 143, with the signal over FC serving to hold the carrier frequency thereof uniform.

The 100-kilocycle signal from conductor FC passes through condenser 208 to the grid of tube 201, and the multivibrator is rendered stable to the 100-kilocycle frequency over FC by adjustment of the grid-return potentiometer 203.

With the output from the cathode of tube 201 connected to the junction of equal resistors 204 and 205, the carrier flow over the upper and lower conductors of the modulator may be precisely balanced by moving the slide arm of bridged resistor 206 to which the output from the cathode of tube 202 is connected.

The output of the modulator is through transformer 207, preferably having a wedding-ring dust-core of toroid form, which carries the signal directly to the grid of pentode input amplifier 210 of filter 144. Condenser 209 is connected across the output of transformer 207 to partially tune it to the 100.3 to 103-kilocycle band.

The intermediate portion of band pass filter 144, between amplifiers 210 and 241 (100.3 to 103 kilocycles), is designed to pass only the upper side band from modulator 143, with a band width of 2700 cycles, corresponding to transmission of voice frequencies from 300 to 3000 cycles. The filtering portion consists preferably of ten similar tank circuits, all tuned initially to the same frequency, 101.5 kilocycles, and then loosely coupled, each to the next in line. These tank circuits may comprise respective toroidal coils 211 to 220, and respective condensers 221 to 230. The noted coupling may consist of windings 231 to 239 having three or four turns each.

The 100.3 to 103-kilocycle output of filter 144 is taken through cathode follower stage 241 over conductor 302 to the second transmitting modulator 145. Conductor 302 is connected to the center tap of the secondary of transformer 301, and the current flow from the input signal through the upper and lower conductors of the modulator may be precisely balanced by moving the slide arm of bridged resistor 303 which is connected to ground return. The band-allocation carrier, which for channel 1 is 110 kilocycles, is supplied over conductor F1 connected to the primary of input transformer 301. This carrier, unlike that supplied to 143, is preferably of sine-wave form which will enable it to pass readily through transformer 301. Here, harmonics arising because of over-modulation in the regions of zero signal strength or of zero carrier strength, result merely in sum and difference frequencies which lie above the 0 to 95-kilocycle band passed by filter 146, since the first, or lowest harmonic of either current lies above 200 kilocycles and even the lower side band of this harmonic with the other input frequency is well above 95 kilocycles.

The output of modulator 145 is through transformer 304, and thence through an amplifier 305 and coupling condenser 306 to low-pass filter 146.

Downward modulation is used in modulator 145, its used intelligence output band having a frequency lower than its intelligence input band. The lower side band used as the transmission band has a frequency of 7 to 9.7 kilocycles for channel 1 and ranges upward to 92 to 94.7 kilocycles for channel 18. Filter 146 has a cutoff frequency above 95 kilocycles permitting passage of the transmitted band of any channel.

Since the 100.3 to 103-kilocycle band is balanced out in modulator 145, filtering in filter 146 is not critical at these frequencies. Any current from the band allocation carrier, with a frequency ranging from 110 kilocycles for channel 1 to 195 kilocycles for channel 18, which appears in the output of modulator 145 is easily eliminated by filter 146. The upper side band and other undesired modulation products from modulator 145 are all somewhat higher in frequency and are easily eliminated by filter 146. Since this filter has no critical cutoff frequency, it may be of simple design.

The signal from filter 146 is amplified by output amplifier 147, which comprises voltage amplifier 320 and power amplifier 321. The output of 320 is coupled through condenser 322 to grid G1 of power amplifier tube 321, which has its anode connected through resistor 327 to the positive pole of the power supply, and has its cathode connected through the equal resistor 328 to the grounded pole of the power supply. A signal is taken from a slider near the anode end of the resistor 327, through condenser 325, to the second control grid G2 of tube 321. Grids G1 and G2 are connected through resistors 324 and 323 to the slider of biasing resistor 333 to provide both with the same adjusted bias potential. Condenser 326 provides a signal by-pass path to ground. Preferably, the two grids G1 and G2 have equal effects, but if the two grids of a tube selected for use at 321 have unequal effects, the one having the greater effect on the plate current of the tube is used as grid G2, and the slider of resistor 327 is adjusted to compensate for any differences in control provided by the two grids.

A twin triode may be used in place of tube 321, with the plates connected together, the cathodes connected together, and the respective grids used as gird G1 and grid G2. Or a single triode with the one grid serving the functions of both grids G1 and G2 may be used, with an appropriate network for feedback from the plate to the grid. Such a network may consist of a resistance connected between condensers 322 and 325, with a tap near the center of the resistance connected to the grid.

With the grids G1 and G2 biased as shown, an input signal on grid G1 causes the usual impedance variations in the cathode-anode space in tube 321, thereby driving a signal current therethrough by way of equal resistors 327 and 328. With equal loads connected to conductors 161, equal and opposite voltages to ground consequently appear at the anode and at the cathode elements of 321 to supply balanced-to-ground voltages over wires 161 and through junction 184 to line L. The signal-voltage drop applied to the cathode of 321 across resistor 328 causes a voltage variation between the cathode and input-signal grid 321 in opposition to the input signal voltage, whereby the cathode-to-ground signal voltage is held to a value no greater than the input signal voltage, as in simple cathode-follower amplifiers. The plate-to-ground signal voltage is thereby held to the same value, but opposite in momentary sign, under the balanced-to-ground load condition assumed.

With the second control grid G2 connected as shown and balanced at the slide of resistor 327 to compensate for any inequality in the control effects of G1 and G2, as described, the signal voltage to ground on the plate of 321 across resistor 327 appears on grid G2 and has a controlling effect on the flow of signal current in 321 which is in phase opposition to the effect exercised by the input signal on G1, whereby the plate-to-ground signal voltage is held to a value no greater than the input signal voltage, as in the case of the cathode-to-ground signal voltage in a simple cathode-follower amplifier. Thus, both of the grids G1 and G2 act degeneratively to the same end—that the signal voltage to ground of the associated electrode (cathode for G1, anode for G2) does not exceed the applied input signal voltage on G1. Conversely, equal currents supplied externally to output conductors 161 cause equal voltages to ground to appear thereon, for the plate-associated output wire then finds the same load to ground at 321 and 327 as is offered to the other output wire at 321 and 328. In each case, the externally applied voltage causes the same degree of control-grid action to occur to influence current-flow through tube 321.

By the foregoing fully balanced-to-ground arrangements at 147, a number of similar output amplifiers 147 may be connected in parallel, or the line L may be subjected to external interference applied equally to its two conductors, without upsetting the desired balanced-to-ground condition of 161 or L.

Output from the tube is taken through the condenser 329 and resistor 330 from the anode side, and through condenser 331 and resistor 332 from the cathode side. The output is connected to path 161 in multiple with the output from similar amplifiers for transmitting sections T2 to T9. Resistors 330 and 332 are of a value such that the series impedance through resistor 330, condenser 329, tube 321, condenser 331, and resistor 332 approximately equals the impedance of path 161.

*Junction to transmission line*

Junction 184 is provided to prevent signals from the transmitting sections from reaching the receiving sections at the same exchange, to prevent cross-modulation in the receiving sections due to the presence of relatively strong signals from the transmitting sections. The junction constitutes a bridge composed entirely of resistance elements, having four center-tapped arms ABC, CDE, EFG, and GHA. The tranismission line L is connected across the opposite diagonal CG. The path 161 from the transmitting sections is connected to mid-points D and H of arms CDE and GHA. Path 171 to the receiving sections is connected to mid-points B and F of arms ABC and EFG. Thus the desired conjugacy between paths 161 and 171 is obtained. Resistors are designated by their terminal points. Resistors CD, DE, GH, and HA are of low resistance of the order of a few hundred ohms and are all equal to one another. Resistors AB, BC, EF, and FG are of a relatively high resistance of the order of several thousands ohms and are all equal to one another. Transmitting signals from path 161 divide with part flowing through resistor DE, line L, resistor HA; and the other part flowing through resistor CD, artificial line 183, and resistor GH. For this transmitting current points A and points C are at equal and opposite potential with arm ABC connected between them having a neutral point B, and points G and E are at equal and opposite potential with the arm EFG connected between them having a neutral point F. Therefore points B and F are of equal potential and no current flows into path 171.

Signal currents received from line L will flow through the bridge and artificial line 183, causing a potential which is balanced-to-ground to appear between points B and F. This signal is applied over path 171 to the receiving sections.

*Receiving section R10*

Signals received at exchange West from line L, through junction 184 and over path 171, are impressed upon the inputs of receiving sections R10 to R18 in multiple.

In the input amplifier 157 of receiving section R10, the received signal is coupled through condensers 354 and 355 to the respective grids of tubes 351 and 352, which comprise a balanced-to-ground push-pull amplifier.

The output from amplifier 157 is balanced-to-ground, and is passed in balanced fashion through low pass filter 156, to modulator 155. Filter 156 has a cutoff frequency above 95 kilocycles, and passes the signals of all channels.

The signal output from filter 156 is carried directly to the input of first receiving modulator 155 without using a transformer. Since no transformer is used between the line and the first receiving modulator, undesired cross-channel transformer-originated modulation in the receiving section is avoided.

The band allocating frequency, which for channel 10 is 155 kilocycles is applied from conductor F10, through condenser 376 to the grid of tube 374. A multivibrator 374, 375, which is similar to the multivibrator of the first transmitting modulator is used to give this local signal a square wave form. The output from the multivibrator is applied to the balanced input of the modulator, with the output from the cathode of tube 375 applied between equal resistors 370 and 371, and the output from the cathode of tube 374 applied to the slider of resistor 373.

To keep cross-channel modulation within the tolerable limit, the amplitude of this square-wave modulating signal is substantially greater than the combined peak amplitude of all the received signals applied to the modulator.

The output from the modulator is through transformer 372 which couples the signal directly to the grid of the pentode amplifier 251 of band-pass filter 154. In the output signal from the modulator, the frequency for the channel being received is in the 100.3 to 103-kilocycle band, and is passed by filter 154, while other signals are rejected.

Band-pass filter 154 in the receiving sections is similar to filter 144 of the transmitting sections. The output is through cathode-follower amplifier 252.

The second receiving modulator 153 is used to reproduce the voice frequencies. The input is through transformer 261. A multivibrator 263, 264, similar to the multivibrator of the first transmitting modulator, supplies a local square wave modulating signal to the balanced input of a modulator between the center tap of the secondary of transformer 261, and the slider of resistor 262. The 100-kilocycle frequency from conductor FC is supplied through condenser 265 to the grid of tube 263 to synchronize the multivibrator. The output is coupled directly to filter 152 without using a transformer.

The voice frequency filter 152 of the receiving section is similar to filter 142 of the transmitting section. This is a low pass filter having a cutoff frequency of 3000 cycles, and rejects the input signals and high frequency modulation products of modulator 153, passing only the desired voice frequencies.

A receiver output amplifier 151 uses electron tubes 171 and 172 in a push-pull circuit. The balanced output from the amplifier is coupled over path 131 to junction 101, and thence to line L1W.

Figure 4:
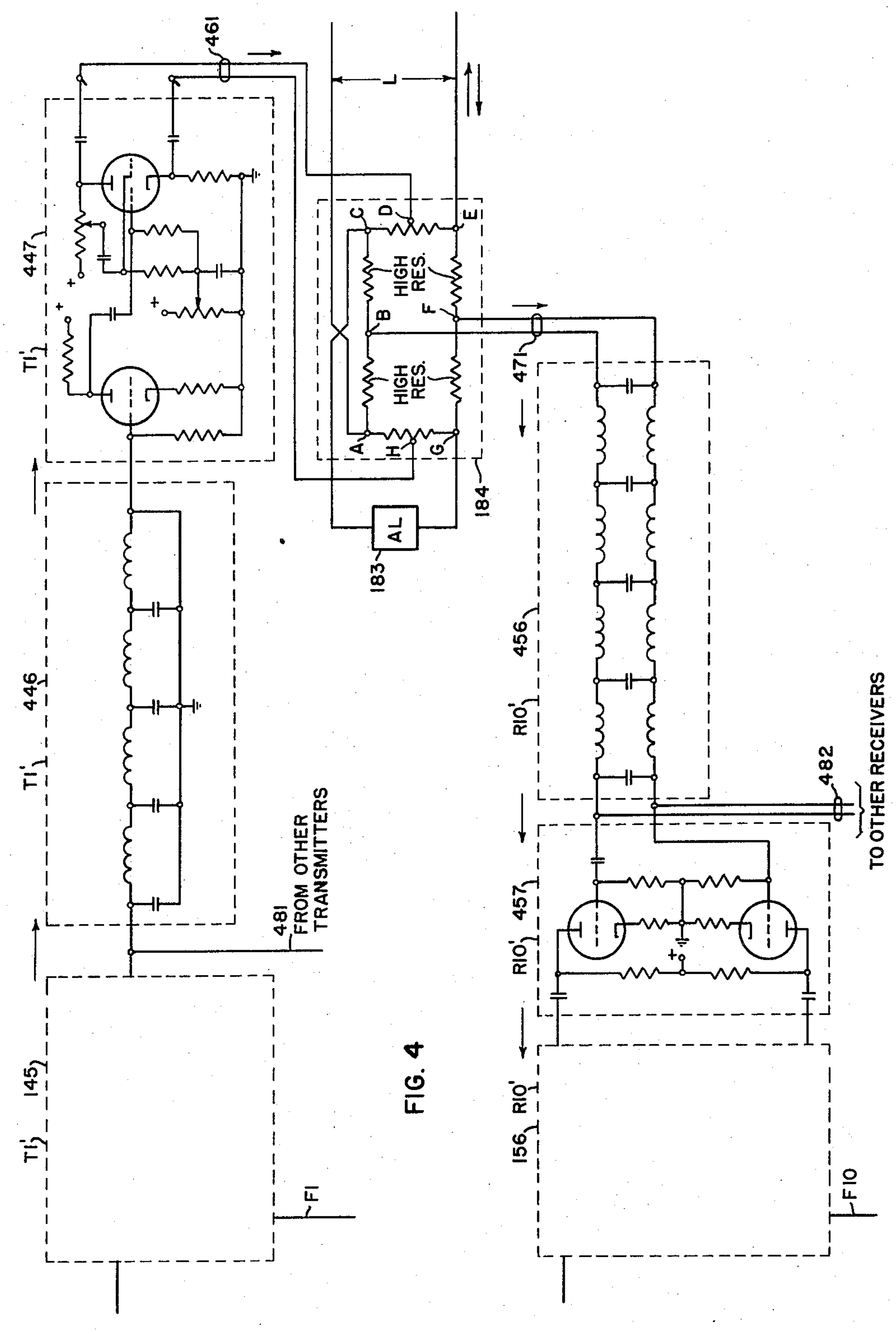

*Figs. 2 and 4.—Alternative embodiment*

Fig. 4 when placed to the right of Fig. 2, shows an alternative embodiment of the circuit arrangement of a portion of the equipment shown in Fig. 3.

From transmitting section T1′, the output of the second transmitting modulator 145 is connected in multiple at conductor 481 with the outputs from the second transmitting modulators of the other transmitting sections.

The 0 to 95-kilocycle low pass filter 446 and the balanced output amplifier 447 are common to the transmitting sections at exchange W. Air-core inductors are used in filter 446, to avoid cross-channel modulation which would be caused by iron used in these inductors.

The output amplifier 447 is similar to the output amplifier 147 as shown in Fig. 3, except that resistors 330 and 332 in the output leads are not used. The output is coupled over path 461 and through junction 184, to line L.

Signals from line L through junction 184, and over path 471, are passed through 0 to 95-kilocycle low pass filter 456. This filter is common to the receiving sections at exchange W. and uses air-core inductors. The output from filter 456 is connected to the inputs of the receiving amplifiers in multiple, by conductor pair 482.

Receiving amplifier 457 for receiving section R10' is similar to amplifier 157 as shown in Fig. 3.

The signal, which was balanced-to-ground through filter 456, is amplified in the push-pull amplifier 457 and its balanced output coupled directly to the first receiving modulator 155.

I claim:

1. In a multichannel telephone carrier system, first lines comprising respective sources of voice-frequency signals, a common transmission line, transmitting sections interposed between respective first lines and the common transmission line to provide respective transmitting channels over the common line, a first modulator in each transmitting section to provide upper and lower first side bands of the signals from the associated line with respect to a first carrier frequency common to all transmitting sections, means for supplying the said first carrier frequency to the first modulator of each section in square-wave form and of an amplitude greater than the peak amplitude of the voice frequency signals, similar band-pass filters in each section to select one of the associated first side bands while rejecting the other, a second modulator in each section coupled to the output of its associated band-pass filter, means for supplying to the respective second modulators band-allocating carrier frequencies which are separated in frequency by an amount in excess of the band width of the band-pass filter to provide upper and lower second side bands of frequencies which are correspondingly different for each section, means coupling the output of the second modulators to the common transmission line, and second filtering means interposed between the second modulators and the transmission line for selecting corresponding second-modulator side bands comprising one side band of each second modulator, while rejecting the other side band of each second modulator.

2. In a multichannel telephone carrier system according to claim 1, the said means for supplying the common first carrier current in square-wave form comprising a separate square-wave generator local to each first modulator, and means for controlling the frequency of all of the square-wave generators from the same source of first carrier frequency.

3. In a multichannel telephone carrier system, first lines comprising respective sources of voice-frequency signals, a common transmission line, transmitting sections interposed between respective first lines and the common transmission line to provide respective transmitting channels over the common line, a first modulator in each transmitting section having two input paths and a common output path, with one input path unbalanced and the other balanced with respect to the output path, the unbalanced input path being connected to receive signals from the associated line, means for supplying a common first carrier frequency to the balanced input of each modulator to provide upper and lower side bands carrying the signals from the associated line, similar first band-pass filters in each section to select one of the associated first side bands while rejecting the other, a second modulator in each section having two input paths and a common output path, with one input path unbalanced and the other balanced with respect to the output path, the balanced input path of each modulator being coupled to the output of its associated first band-pass filter, means for supplying to the unbalanced inputs of the respective second modulators band-allocating carrier frequnecies which are separated in frequency by an amount in excess of the band width of the first band-pass filters to provide upper and lower second side bands of frequencies which are correspondingly different for each section, means for coupling the output of the second filtering means to the common transmission line, second filtering means interposed between the second modulators and the transmission line for selecting one side band of one second modulator and the corresponding side band of each other second modulator, while rejecting the other side band and other modulation products of each.

4. In a multichannel telephone carrier system, a transmission line arranged to carry similar separated bands of signal frequencies corresponding to respective carrier channels, local lines at the receiving end of the transmission line corresponding respectively to the said bands and channels, receiving sections corresponding respectively to the channels and interposed between the transmission line and the respective local lines, a first modulator in each receiving section arranged to receive and modulate all said bands of frequencies by their interaction with a local band-allocating frequency, means for supplying to the first modulators in square-wave form respective local band-allocating carrier frequencies, with each such frequency differing substantially the same as any other such frequency from the associated signal band of frequencies, whereby each modulator produces a distinct group of side bands of all received frequency bands which includes a desired side band of its associated received band which is the same for all sections, the said local frequencies being supplied at an amplitude greater than the normal combined peak amplitude of all the received signals, each section including a band-pass filter to select the said desired side band for that section while rejecting all other associated side bands, and separate similar second-modulator means in each section for converting the said desired side band to a voice-frequency band for the associated local line.

5. In a multichannel telephone carrier system, local lines comprising respective sources of voice-frequency signals, a two-wire balanced-to-ground transmission line, voice-to-carrier transmitting sections interposed between respective first lines and one end of the transmission line to provide respective carrier channels over the transmission line, means coupling the output of the transmitting sections to the transmission line while preserving its balanced-to-ground character, said coupling means including a multi-electrode output amplifier for at least one section having output electrodes corresponding respectively to the conductors of the transmission line, means in the amplifier for applying unbalanced-to-ground signals to each said output electrode which are equal to the signals applied to the other output electrode but are opposite thereto in phase, means connecting each said output electrode to its corresponding transmission-line conductor independently of the connection of the other output electrode to its corresponding conductor, whereby the necessity is avoided of the use of transformer coupling means which is either costly or is liable to the production of inter-channel modulation, local lines and respective voice-to-carrier transmitting sections at the other end of the transmission line, carrier-to-voice receiving sections at each end of the transmission line interposed between the transmission line and the respective associated local lines to receive from the transmitting sections at the other end, amplifier means coupling each end of the transmission line to the associated receiving sections while preventing the transmission to these sections of any equal in-phase spurious signals which appear on the transmission-line conductors, the said amplifier means including a multi-electrode input amplifier for at least one section including similar unbalanced-to-ground control electrodes connected to the respective conductors of the transmission line, together with respectively corresponding controlled output electrodes which are individually unbalanced-to-ground, and circuit coupling means interposed between the last said output electrodes and the succeeding portion of any associated receiving section and arranged to block transmission to the receiving section of equal in-phase signals on the output electrodes while transmitting thereto the differential of the signals on such electrodes.

6. In a multichannel telephone carrier system according to claim 5, means for preventing signals transmitted at either end of the transmission line from entering the local receiving sections to thereby tend to cause inter-channel modulation, which comprises a balanced eight-terminal bridge with a succession of eight resistors interconnecting the terminals to form an octal ring or eight-sided bridge which provides connecting points for two pairs of opposite diagonals, the transmission line being connected across a diagonal of one said pair, with a balancing artificial line connected across the other diagonal of the same said pair, means connecting the output of the associated transmitting sections across one diagonal of the remaining pair of diagonals, and means connecting the input of the associated receiving sections across the remaining diagonal, whereby the signals incoming over the transmission line reach the receiver-section input and the transmitter-section output, and the transmitter-section output reaches the natural and artificial lines, but is balanced out from reaching the receiver-section input.

7. In a multichannel telephone carrier system according to claim 6, the four resistors which are connected to the points defining the diagonal across which the receiving-section input is connected being of substantially higher resistance than the remaining four resistors, whereby transmitting loss is reduced.

References Cited in the file of this patent

UNITED STATES PATENTS

| | | |
|---|---|---|
| 1,910,977 | Weis | May 23, 1933 |
| 2,411,030 | Ryder | Nov. 12, 1946 |
| 2,505,061 | Oliver | Apr. 25, 1950 |
| 2,558,018 | Thornton et al. | June 26, 1951 |
| 2,618,711 | Bourget | Nov. 18, 1952 |
| 2,624,806 | Wright et al. | Jan. 6, 1953 |